340-870.14 SR

XR 3,440,657

April 22, 1969 R. S. CATALDO 3,440,657

MULTICHANNEL MULTIPLEX COMMUNICATION SYSTEM USING PULSE WIDTH MODULATION AND AN AUDIO SYNC ON ONE PULSE

Filed Aug. 5, 1965

Sheet 1 of 2

INVENTOR.
Roy S Cataldo
BY
Thomas N. Young
ATTORNEY

3440657
OR IN 343/225

April 22, 1969 R. S. CATALDO 3,440,657

MULTICHANNEL MULTIPLEX COMMUNICATION SYSTEM USING PULSE WIDTH MODULATION AND AN AUDIO SYNC ON ONE PULSE

Filed Aug. 5, 1965 Sheet 2 of 2

INVENTOR.
Roy S. Cataldo
BY
Thomas N. Young
ATTORNEY

United States Patent Office 3,440,657
Patented Apr. 22, 1969

3,440,657

MULTICHANNEL MULTIPLEX COMMUNICATION SYSTEM USING PULSE WIDTH MODULATION AND AN AUDIO SYNC ON ONE PULSE

Roy S. Cataldo, Birmingham, Mich., assignor to General Motors Corporation, Detroit, Mich., a corporation of Delaware Filed Aug. 5, 1965, Ser. No. 477,500
Int. Cl. H04g 7/00
U.S. Cl. 343—225 2 Claims

ABSTRACT OF THE DISCLOSURE

A multichannel communication system in which the transmitter produces individually duration-modulated pulses in each of a plurality of separate and sequential time intervals, the first of which carries a tone to indicate its identity. In the receiver, the tone is directed through a filter and subsequent circuitry which decodes the signal in the first time interval and feeds a plurality of gate signal generators which, after sequential delays correlated to the transmitter intervals, open individual decoding channels in a fixed sequence to receive the other transmitted pulses.

Figure 1:
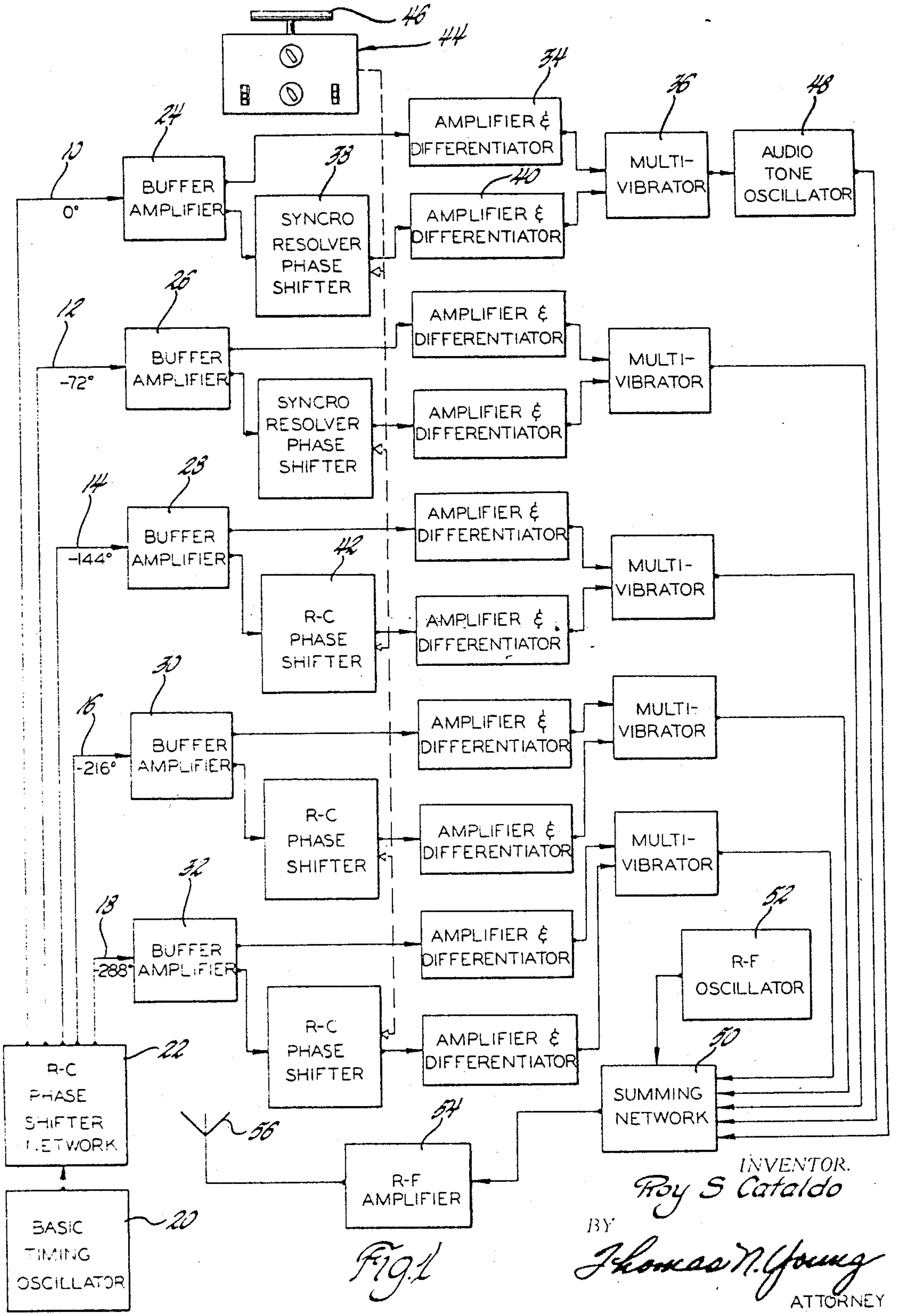

This invention relates to multichannel communication systems and more particularly to a multichannel communication system for producing, transmitting and receiving signals which are separated in time for channel distinction and modulated in duration for information conveyance.

In multichannel communication systems of the type employing either a radio link or single wire for the conveyance of signals between a transmitting station and a receiving station, some technique must be employed for maintaining the separate identities of the signals in the various channels. One technique is to identify each channel with a signal of distinct frequency and to provide each receiver channel with a filter for selecting the signal of the frequency which corresponds to that channel. Another technique is to transmit the various channel signals in a time sequence and to simultaneously transmit an amplitude modulated synchronizing signal which activates the receiver channels in the proper time sequence to effectively separate the signals among the receiver channels. In addition, various combinations of techniques may also be employed.

The transmitted signals must not only be separated among the various receiver channels in a systematic fashion but must also be modulated to carry and convey information. Among the modulation techniques which may be employed are amplitude modulation and pulse duration modulation. In the latter, the duration of the signals transmitted in each channel are modulated according to the information to be conveyed. Pulse duration modulation is often preferred in communication systems since active circuit elements such as transistors may be operated in a switching mode, i.e., fully on or fully off, thus contributing to the overall accuracy and efficiency of the system. Further, such a system is less subject to noise problems occasioned by interferences which tend to erroneously vary the amplitude of the received signal.

According to the present invention, a plurality of signals each representing different quantities of information may be conveyed between a transmitter and a receiver over a plurality of signal channels in such a manner as to maintain the separate identity of the signals in each of the channels and further to permit the use of the signal pulse duration modulation technique to impress the desired information onto each of the channel signals. In a multichannel communication system which operates in accordance with the present invention, channel identification and separation is accomplished by assigning to each channel a separate transmitting time and further by operating the channels in a repeatable sequence. A first channel which initiates the repeatable sequence is provided with means to impress upon the signal therein a distinct character, such as a tone of distinct frequency, which indicates to means associated with the receiver that the sequence of time separated signals has begun. Means are provided at the receiver to actuate the receiver channels in a time sequence which is synchronized with the time sequence of the transmitter to distribute the signals among the appropriate channels.

Cooperating with the channel separation technique generally described above is a signal modulation technique by which information may be inserted into each channel. According to the invention, the signals produced in each signal channel may be modulated in duration over a range corresponding to the time period assigned to each channel. By maintaining a constant repetition rate, it can be seen that varying the duration of the signal in each channel is effective to vary the average value of the signal received in each receiver channel. Information is accordingly transmitted in each channel by means of the pulse duration modulation technique.

Figure 2:
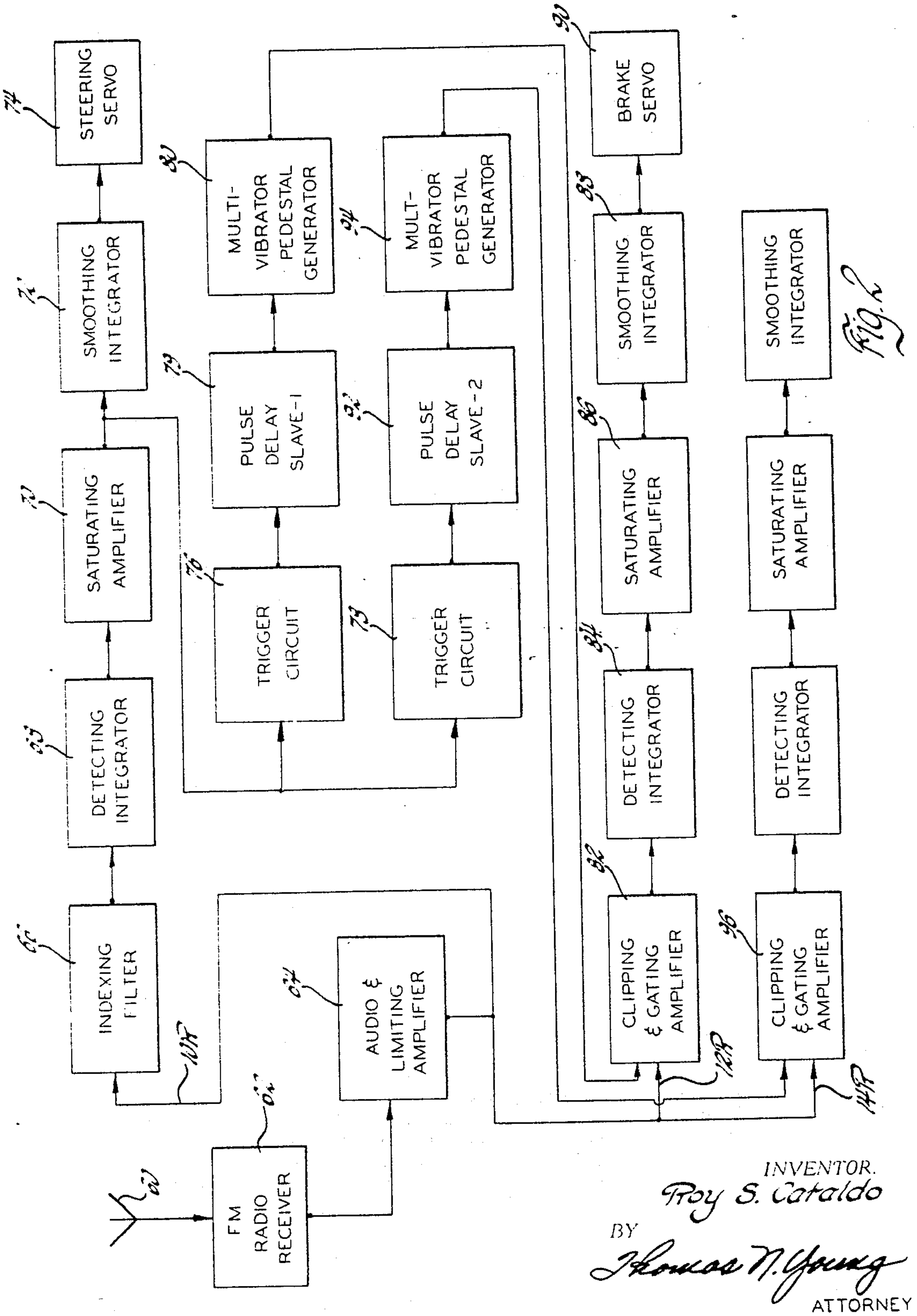

A full understanding of the invention may best be conveyed by describing a specific embodiment thereof. Such an embodiment is described in the following portion of the specification and is shown in the accompanying drawings of which:

FIGURE 1 is a block diagram of a transmitter which embodies the principle of the invention; and FIGURE 2 is a block diagram of a receiver which also embodies the principle of the invention and is operable in combination with the transmitter shown in FIGURE 1.

The drawings show a five channel communication system in which five separate quantities of information may be separately transmitted over separate channels. The five receiver channels are adapted to be connected to separate utilization means for controlling five separate functions which are necessary to the remote control of an automotive vehicle. This description is not intended to limit the applicability of the invention to remote vehicle control but affords an opportunity to demonstrate the utility of the invention as applied to multichannel communication systems.

Referring specifically to FIGURE 1, five time separated signals of sinusoidal waveform are used to generate time spaced signals in the signal channels generally designated at 10, 12, 14, 16 and 18. These sinusoidal waveforms are produced by means including a basic timing oscillator 20 and a five channel RC phase shift network 22. The oscillator 20 produces a single phase sinusoidal voltage waveform. This waveform is applied to the five channel phase shift network 22 which contains five parallel phase shifting networks which are effective to shift the basic signal by amounts which increase in increments of 72°. For example, the phase shift network 22 passes the basic oscillator waveform to channel 10 without a phase shift but produces a sinusoidal waveform on channel 12 which lags the waveform on channel 10 by 72°. As indicated in the drawings, the signal on channel 14 lags that on channel 12 by an additional 72°. The time lag in channels 16 and 18 is also increased by an additional 72° per channel.

It will immediately be appreciated that the increments of 72° are chosen such that the full-time period of 360° is equally divided into five time periods of equal length among the five signal channels. If more channels are required, a lesser phase shift may be employed. In addition, it may in certain circumstances be desirable to employ channel time portions of the unequal duration. However, in the present instance, it is to be understood that the portion of the repeatable time sequence or period which is defined by the basic timing oscillator 20 which is occupied by each channel is equal to that occupied by each other channel.

The sine wave signals on the initial portions of the channels 10, 12, 14, 16 and 18 are passed through individual isolating buffer amplifiers 24, 26, 28, 30 and 32, respectively. Each of the buffer amplifiers is provided with two outputs to effectively divide each signal channel into two signal paths for the purpose of defining duration modulatable pulse generator means which produce the information pulses to be transmitted by the various channels. Channel 10 may be described as exemplary of all of the channels. The first output of buffer amplifier 24 is connected to an amplifier and differentiator circuit 34 where the zero phase shifted sinusoidal waveform is converted into a square waveform and differentiated to produce positive and negative pulses on the edges of the square wave. The positive pulses may be discarded using a diode, and the negative pulses are conducted to a first input of a multivibrator 36. The multivibrator 36, upon receipt of a negative pulse from the amplifier differentiator circuit 34, is effective to produce an output voltage of constant amplitude. The signal from the amplifier and differentiator circuit 34 is thus effective to define the beginning of the signal pulse which is produced in channel 10. Similarly, the output from each of the corresponding amplifier and differentiator circuits in the remaining channels is also effective to define the beginning of the transmitted signal pulse in each of the remaining channels. Since the original sinusoidal waveform which is distributed among the channels is shifted by 72° in each channel, it can be seen that the beginnings of the signal pulses in the channels are fixed in time relation and spaced by increments of 72°. Accordingly, each channel is allotted a maximum time period of 72 electrical degrees of the basic timing period defined by oscillator 20. The portion of this maximum duration which is used in each channel depends upon the position of the end of the signal pulse which in turn is determined by the information to be conveyed. The definition of the end of the pulse is described below. It will be understood by those skilled in the art that perhaps several degrees of guard time may be desirable between each of the channels in order to eliminate cross talk.

To define the end or trailing edge of each of the signal pulses in the various channels, a second path in each of the channels is provided. Again referring to channel 10 as exemplary of the other channels, the second output of buffer amplifier 24 is fed through a phase shifter 38 and from the phase shifter 38 to a second amplifier and differentiator circuit 40. Circuit 40, like circuit 34, squares the sinusoidal waveform and differentiates it to produce pulses of which the negative pulses are used to define the end of the signal pulse in channel 10. This is accomplished by applying the negative pulses from circuit 40 to the second input of multivibrator 36 to turn the multivibrator off. Similarly, the second output of each of the remaining buffer amplifiers 26, 28, 30 and 32 is also fed through a phase shifting device to an amplifier and differentiator circuit which produces the pulse defining the end or trailing edge of the signal pulse in that channel. It can be seen that by shifting the phase of the sinusoidal waveform from buffer amplifier 24 by means of the phase shifting devices such as 38, the signal defining the trailing edge of the pulse in each channel may be varied over a range which corresponds to the phase shifting range of, for example, phase shifting device 38. The signal in channel 10 may be of the maximum duration of 72° of time allotted to that channel or any lesser portion thereof according to the information which is to be represented by the duration of the output of multivibrator 36.

To obtain infinitely variable phase shift control, phase shifting device 38 may, for example, be a synchro resolver. If, on the other hand, only steps or increments of phase shifting are required in the particular channel, an RC phase shifting network in which capacitors may be switched in and out of the network may be employed as indicated at 42 in channel 14.

The phase shifting devices are connected through separate paths to a master control unit 44. This control unit includes operating elements, as was previously indicated, which function to control the vehicular functions necessary to the remote operation of an automotive vehicle. For example, control unit 44 may include a control bar 46 which is rotatable about a vertical axis to provide varying degrees of phase shift in synchro resolver phase shifter 38. In addition, the control bar 46 may be displaceable both forward and backward to control vehicle throttle and brakes through connections with channels 12 and 14, respectively. Various other vehicular functions such as transmission mode and truck bed raising and lowering may be controlled by other elements associated with the master control unit 44 and connected into the appropriate signal channels of the transmitter.

It has been shown that the transmitter produces a repeatable sequence of five signals the beginning of each signal being fixed in position on a relative time scale. For the purpose of providing an indexing signal which indicates to the receiver the beginning of the sequence of channel signals, the output of multivibrator 36 is connected to an audio tone oscillator 48 which impresses a tone of distinct frequency on the rectangular waveform produced by multivibrator 36. The duration modulated signal pulse from each of the channels including the signal from channel 10 having the audio tone impressed thereon is connected to a passive summing network 50. In the summing network the signals are employed to individually modulate the output of an RF oscillator 52. The modulated output of oscillator 52 is amplified by radio frequency amplifier 54 and transmitted by way of an antenna 56. In addition to the on-off time modulation of the RF output of oscillator 52, the audio tone in channel 10 also produces a carrier frequency modulation on the first signal to be transmitted in the sequence of five signals. It will be appreciated that while the specific embodiment is shown to include a radio link between transmitter and receiver, a single wire link may also be employed.

Summarizing the operation of the transmitter, a series of five time spaced signal pulses are produced in the five independent channels 10, 12, 14, 16 and 18. Each of the signals has a leading edge which occurs at the same time position in each repeatable sequence of operation of the channel. In the five channel embodiment shown, the leading edges of the signals produced in the channels are time spaced by increments of 72 electrical degrees. However, the trailing edge of each of the pulses occurs at some variable point up to but not exceeding 72 electrical degrees after the leading edge of that pulse, the particular point of occurrence for each trailing edge being determined by the amount of phase shift introduced via the controlling implement in master control unit 44 which corresponds to the particular channel. Accordingly, five time spaced signals of fixed frequency and constant magnitude but of variable duration are provided by the transmitter shown in FIGURE 1. In addition, the first of the signal pulses produced in the repeatable transmitter sequence carries an audio tone modulation of distinct frequency which is employed in the receiver as an indexing signal.

Referring now to FIGURE-2, the receiver unit which is operable in conjunction with the transmitter of FIGURE 1 is shown. For simplicity only three channels of the receiver unit are shown. It is to be understood that additional channels which are substantial duplicates of those shown may be employed.

Completing the radio link which was shown to exist in FIGURE 1, the receiver includes a receiving antenna 60 which is connected to a conventional FM radio receiver 62 and an audio and amplitude limiting amplifier 64. The output of amplifier 64 is commonly connected to each of the three receiver channels designated as 10R, 12R and 14R. The numbering of the receiver channels is chosen to indicate the relation to the transmitting channels 10, 12 and 14. The channel 10R includes an indexing filter 66 which is tuned to pass only a signal of modulating frequency imposed by the audio tone oscillator 48 of FIGURE 1. This filter is connected to a detecting integrator 68 and a saturating amplifier 70. The indexing filter removes all of the signals received from the transmitter except that from channel 10. The signal which is passed by indexing filter 66 is detected in the integrator 68 which effectively removes the audio tone leaving the duration modulated rectangular waveform of its envelope. This signal is amplified at 70 and applied to an integrator 72 which is effective to produce a DC voltage corresponding to the average value of the rectangular pulses received on channel 10R. This DC voltage may be applied to a utilization means such as servo control unit 74, which in this case may be carried by a vehicle and employed to control the steering system thereof.

The signal which is received by channel 10R, in addition to its use in controlling the servo unit 74, is also applied to a plurality of time selection means to be used as an index signal to synchronize the operation of each of the other channels 12R and 14R with the signals which are produced in transmitter channels 12 and 14. In order to open channels 12R and 14R in a sequence which corresponds to the time spacing of the signals from transmitter channels 12 and 14, the leading edge of the initial signal received by channel 10R is connected from the output of saturating amplifier 70 to a pair of time selection means including trigger circuits 76 and 78. The trigger circuits 76 and 78 are employed to more accurately define the leading edge of the indexing signal which is passed by filter 66. This leading edge as reproduced by trigger circuit 76 is sent to a delay circuit 79 which is effective to delay the signal applied thereto by 72 electrical degrees corresponding to the 72° phase shift between the leading edges of the signals which are produced in transmitter channels 10 and 12. The delayed output of delay 79 is connected to a pedestal generator 80. The pedestal generator 80 is an astable multivibrator having a timing cycle of exactly 72 electrical degrees, again corresponding to the time spacing of the transmitter channels. The output of multivibrator 80 is connected to an input of a clipping and gating amplifier 82 which is contained in channel 12R. This signal from the pedestal generator 80, as applied to the first input of amplifier 82, is effective to open channel 12R to the signal which is applied thereto by the amplifier 64. Since the opening of channel 12R occurs exactly 72 electrical degrees after the leading edge of the indexing signal which is passed by filter 66, it can be seen that channel 12R will be effective to pass the signal which is produced in channel 12 of the transmitter shown in FIGURE 1. Since the output of the pedestal generator 80 corresponds to the maximum pulse duration of the signal from channel 12, it can be seen that channel 12R will remain open for the maximum of 72 electrical degrees thus to pass the entire signal from channel 12 regardless of its duration. Since generator 80 turns off automatically, no separate turn off signal for channel 12R is required.

The signal in channel 12R which is passed by the gating amplifier 82 is applied to a detecting integrator 84 which removes the carrier frequency which is applied by RF oscillator 52 in the transmitter leaving the duration modulated rectangular envelope. This signal is amplified at 86 and applied to an integrator 88 which produces a DC voltage corresponding to the average value of the signals applied thereto. This DC voltage again may be used for control purposes and to this end is applied to a brake servo unit 90. The servo unit 90 may be carried by a vehicle for the purpose of controlling the application of the brake system thereof.

The third channel 14R shown in the receiver system is identical to channel 12R just described. The time selection means for channel 14R includes a second delay circuit 92 and a second multivibrator pedestal generator 94. The delay circuit 92, however, is effective to delay the output of the trigger circuit 78 by 144 electrical degrees before initiating the production of the 72° duration pedestal signal from the generator 94. Since the 72° duration signal from pedestal generator 94 is delayed by an additional 72° before application to the gating amplifier 96 to open channel 14R, this channel will be open in correspondence with the leading edge of the signal from transmitter channel 14. The signal of modulated duration which is received by channel 14R may be detected and integrated in exactly the same fashion as was described above with reference to channel 12R.

It can be seen that additional trigger circuits, delay means and time selection pedestal generators may be employed for each additional signal channel which might be used in the receiver. Any such additional receiver channels would be under the control of delay circuits such as 79 and 92 which would be effective to produce delays of increasing increments of 72° and thus to open the additional channels in the proper timing sequence to correspond with the transmitted signals. It should be noted as a particular advantage of the specific embodiment shown that the first signal channel is employed not only to index the timing sequence for the remaining channels but also carries a duration modulated signal to be used in controlling some function such as the steering function shown in the specific embodiment. Accordingly, it is not necessary to provide a separate channel the sole function of which is to provide the indexing mechanism. Since only the leading edge of the indexing signal is used for application to trigger circuits 76 and 78, channel 10R may perform the dual function indicated.

While the invention has been described with reference to a five channel system used to control five independent vehicular functions, it is to be understood that the invention is not limited to this specific embodiment but may vary according to the desired application.

I claim:

1. A multichannel communication system including a transmitter for repeatedly producing an output sequence consisting of a plurality of sequential time intervals each representing a distinct signal channel within which occurs a signal of effectively fixed amplitude but varying duration, the first signal in the sequence being impressed with a modulating tone to be distinct from the other signals, and a receiver operative to receive the output sequence and including a plurality of decoding channels each corresponding to one of the signal intervals, means for applying the output sequence to all of the decoding channels, the first of said decoding channels including a filter designed to accept only said first signal and decoder means for determining the average duration of repeating signals applied thereto, the other of said decoding channels each including a normally closed gate circuit connected to receive the output sequence when open and decoder means for determining the average duration of repeating signals received thereby, a plurality of gate signal generators having inputs and outputs, said inputs being connected to receive the said first signal accepted by said filter to produce on said outputs a sequence of gate voltages progressively delayed in time from receipt of said first signal, and means connecting respective outputs of the gate signal generators to respective gate circuits to open said gate circuits in a timed sequence such that each gate circuit is opened during a different signal interval thereby to distribute the sequence among the decoding channels.

2. A multichannel communication system as described in claim 1 further including means within the transmitter for independently varying the duration of the signals in said intervals and utilization means connected to the respective decoding channels and responsive to the average duration of signals therein to perform control functions.

References Cited

UNITED STATES PATENTS

| | | | |
|---|---|---|---|
| 2,418,116 | 4/1947 | Grieg. | |
| 2,434,965 | 1/1948 | Shepherd. | |
| 2,616,977 | 11/1952 | Staal | 343—203 |
| 2,656,524 | 10/1953 | Gridley et al. | 340—206 |
| 2,917,584 | 12/1959 | Holzwarth et al. | |
| 3,372,393 | 3/1968 | Cataldo | 343—225 |

JOHN W. CALDWELL, *Primary Examiner.*

A. J. KASPER, *Assistant Examiner.*

U.S. Cl. X.R.

179—15; 343—204; 340—167, 206 171; 325—60